Sept. 1, 1931.  W. J. TERRY  1,821,451
DENTAL HANDPIECE ATTACHMENT SEALER
Filed Jan. 16, 1930
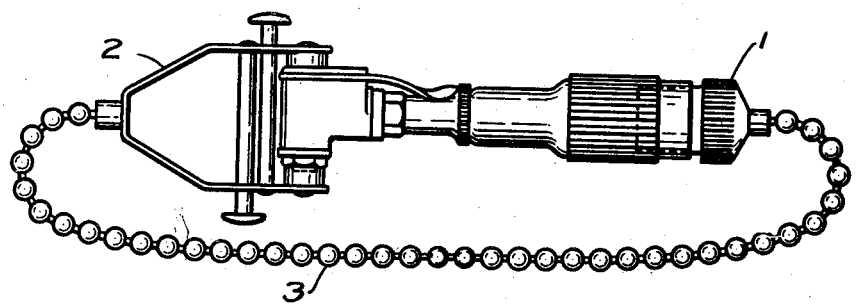
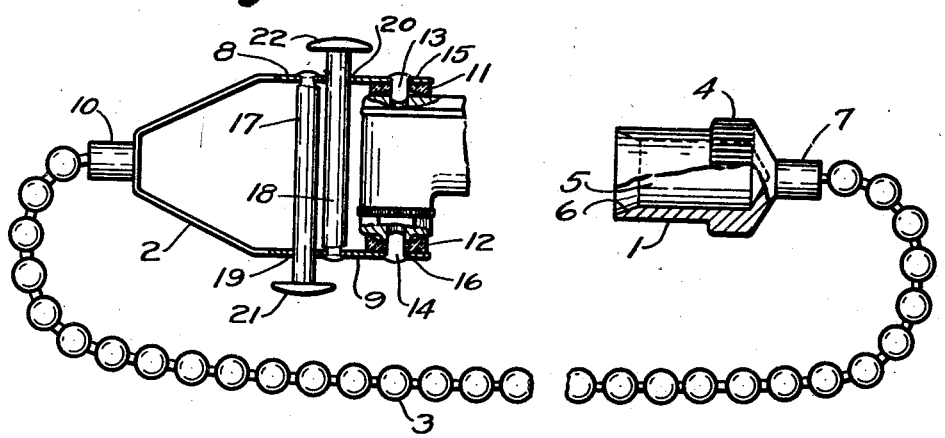
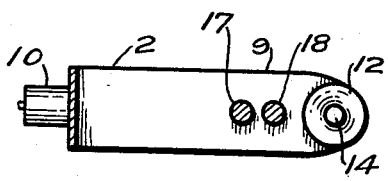
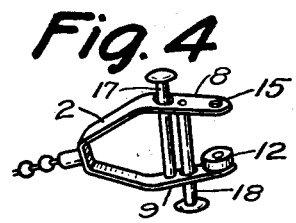
INVENTOR
Walter J. Terry
BY
Harry Bowen
ATTORNEY Patented Sept. 1, 1931

1,821,451

UNITED STATES PATENT OFFICE

WALTER JOHN TERRY, OF SEATTLE, WASHINGTON

DENTAL HANDPIECE ATTACHMENT SEALER

Application filed January 16, 1930. Serial No. 421,268.

The invention is a sealing apparatus for dental handpiece attachments which makes it possible to readily seal the openings at the ends of the attachment so that the exterior of the attachment may be sterilized, and which is so arranged that it may be used for contra angle or right angle handpiece attachments of any type or design.

The object of the invention is to provide means for sealing the openings of handpiece attachments so that the exterior of the attachment may be sterilized without admitting the sterilizing fluid to the interior.

Another object of the invention is to provide an attachment for sealing the openings of handpiece attachments which may be used for different types of attachments.

A further object of the invention is to provide means for sealing the ends of handpiece attachments which may be readily and at the same time securely installed.

And a still further object of the invention is to provide an attachment for sealing the ends of handpiece attachments for sterilizing which is of a simple and economical construction.

With these ends in view the invention embodies a plug adaptable to be inserted in the handle end of a handpiece attachment, a spring clip with rubber washers adaptable to be placed over the bur openings of the handpiece head, and means for flexibly attaching the spring clip and plug, to insure their being always together when wanted for use and to prevent either being lost.

Other features and advantages of the invention will appear from the following description taken in connection with the drawings, wherein:

Figure 1 is a view showing the device as it would appear in use.

Figure 2 is an enlarged sectional view showing means for locating and holding the spring clip on an attachment head.

Figure 3 is a sectional plan through the spring clip.

Figure 4 is a view showing the spring clip with one of the washers omitted as it may be used with attachments having a sealing cup projecting at the back of the head as used in seal-tite angles.

In the drawings the device is shown as it would be made wherein numeral 1 indicates the plug, numeral 2 the spring clip, and numeral 3 a flexible chain connecting the plug and clip.

The plug 1 is made of a sleeve as indicated by the numeral 1 with a knurled shoulder 4 around one end, an opening 5 on the interior thereof and beveled surfaces 6 at the inner edges of the walls. At the back of the plug is a connection 7 which may be of any suitable design and adaptable to attach a flexible cord or chain of any type to the plug.

The spring clip 2 may also be of any suitable design and arranged in any suitable manner. In the design shown it is formed of a flat piece of spring material bent as shown with horizontal portions 8 and 9, substantially forming a U with a connection 10 at the base by which it may be attached to the chain or cord 3. At the tips of the members 8 and 9 are cup shaped washers 11 and 12 which are made of rubber or any suitable resilient material. These cup shaped washers are mounted upon pins 13 and 14 and the pins are mounted in the openings 15 and 16 of the members 8 and 9. It will be observed that these pins may be removed as shown in Figure 4 and the clip may be used with one washer as indicated by the numeral 12 and one opening as indicated by the numeral 15, shown in Figure 4 so that the washer 12 may be placed over the bur opening and the opening 15 placed over a projection at the upper side of the instrument for certain types of attachments.

The members 8 and 9 are provided with pins 17 and 18 as shown wherein the pin 17 is freely attached to the member 8 and the pin 18 similarly attached to the member 9, with the pin 17 extending through an opening 19 in the member 9 and the pin 18 extending through an opening 20 in the member 8. The outer ends of the pins 17 and 18 are provided with heads 21 and 22 by which they may be gripped by the thumb and forefinger to open the spring clip when placing it upon the head of the attachment as it will be observed that by pressing on the heads of these pins the members 8 and 9 will be forced apart. It will be appreciated, however, that any other means may be used for forcing these members apart and also that the washers 11 and 12 may be held in any suitable manner.

It will be understood that other changes may be made in the construction without departing from the spirit of the invention. One of which changes may be in the use of other means for holding the devices in or upon the openings, another may be in the use of other means for holding the devices together and still another may be in the use of washers of another type or design for sealing the bur openings of the head.

The construction will be readily understood from the foregoing description. In use the device may be provided as shown and when it is desired to sterilize the attachment the plug 1 is inserted in the handle opening in which it is held by friction, and the washers 11 and 12 of the spring clip are placed over the bur openings of the head with the pins 13 and 14 extending into the openings to locate and hold the spring clip in place. It will be noted that by pressing upon the heads 21 and 22 of the pins 17 and 18 the pins 13 and 14 may be forced out of the openings of the head so that the spring clip may be removed. The plug 1 may also be withdrawn from the handle opening. The device may therefore be readily installed and removed and while in place the attachment is thoroughly sealed so that it may be sterilized without danger of the sterilizing fluid entering the interior or of the lubricant in the interior leaking out.

Having thus fully described the invention what I claim as new and desire to secure by Letters Patent, is:

1. In a sterilizing attachment of the character described, a plug adaptable to be inserted in the handle opening of a dental handpiece attachment to seal the same, a spring clip, resilient cup shaped renewable washers mounted in the spring clip and positioned to be placed over the bur openings in the head of a handpiece attachment, pins in the centers of the washers to fit into the bur openings to locate the clip, means for opening the said spring clip, and means for flexibly attaching the said spring clip and plug.

2. In a device for sealing dental handpiece attachments, a closure for the opening at the handle end of the said attachment suitable closures for the openings in the head of the said attachment, a spring clip in which the said head opening closures are mounted, and means in said clip removably holding said closures, and locating said spring clip and closures on said head.

3. In a device for sealing dental handpiece attachments, a closure for the opening at the handle end of the said attachment, suitable closures for the openings in the head of the said attachment, and a spring clip for holding the closures for the openings in the head upon the head.

4. In a device for sealing dental handpiece attachments, a closure for the opening at the handle end of the said attachment, suitable closures for the openings in the head of the said attachment, a spring clip in which the said head opening closures are mounted, means in said clip removably holding said closures, and locating said spring clip and closures on said head, and means for attaching the said closure for the opening in the handle to the clip.

5. In a device of the class described, a plug forming a closure for an opening in the end of a sleeve, a spring clip with suitable closures therein, and flexible means for attaching the clip and plug together.

6. In a sealer for dental handpiece attachments of the type having a handle with a shaft opening at the outer end and a head with openings therein, a closure adapted to be inserted in the said shaft opening of the handle, washers forming head opening closures, a spring clip adapted to removably hold said washers against said head closing the openings therein and in which said washers are mounted, and flexible means attaching said handle opening closure to said clip.

In testimony whereof he affixes his signature.

WALTER JOHN TERRY.